(12) United States Patent
Kawahara et al.

(10) Patent No.: US 11,185,098 B2
(45) Date of Patent: Nov. 30, 2021

(54) FROZEN FOOD

(71) Applicant: NISSHIN FOODS INC., Tokyo (JP)

(72) Inventors: Toshio Kawahara, Saitama (JP); Yumiko Nakanishi, Saitama (JP)

(73) Assignee: NISSHIN FOODS INC., Tokyo (JP)

( * ) Notice: Subject to any disclaimer, the term of this patent is extended or adjusted under 35 U.S.C. 154(b) by 91 days.

(21) Appl. No.: 15/543,112

(22) PCT Filed: Jan. 13, 2016

(86) PCT No.: PCT/JP2016/050816
§ 371 (c)(1),
(2) Date: Jul. 12, 2017

(87) PCT Pub. No.: WO2016/139972
PCT Pub. Date: Sep. 9, 2016

(65) Prior Publication Data
US 2018/0007938 A1 Jan. 11, 2018

(30) Foreign Application Priority Data
Mar. 4, 2015 (JP) .............................. JP2015-041983

(51) Int. Cl.
*A23L 3/36* (2006.01)
*A23L 23/00* (2016.01)
*A23L 7/109* (2016.01)

(52) U.S. Cl.
CPC ................. *A23L 3/364* (2013.01); *A23L 3/36* (2013.01); *A23L 7/109* (2016.08); *A23L 23/00* (2016.08); *A23V 2002/00* (2013.01)

(58) Field of Classification Search
CPC .......... A23L 3/364; A23L 23/00; A23L 7/109; A23L 3/36
See application file for complete search history.

(56) References Cited

U.S. PATENT DOCUMENTS 5,314,705 A * 5/1994 Hansson ................. A23L 13/72
426/574

FOREIGN PATENT DOCUMENTS

| JP | 07-322838 | 12/1995 |
|---|---|---|
| JP | 09-299052 | 11/1997 |
| JP | 2002-199852 | 7/2002 |
| JP | 3092734 | 3/2003 |

(Continued)

OTHER PUBLICATIONS

Machine translation JP 2006-061113 (Year: 2006).*

(Continued)

*Primary Examiner* — Katherine D Leblanc
(74) *Attorney, Agent, or Firm* — Nixon & Vanderhye (57) ABSTRACT

A frozen noodle product includes: a frozen noodle block, as a main food portion, obtained by freezing and hardening a cooked food; and a sauce portion obtained by freezing and hardening a sauce to be eaten together with the cooked food. The frozen noodle block has a sauce-portion arranging surface on which the sauce portion is arranged. An opening is formed in the sauce-portion arranging surface. The sauce portion is arranged on the frozen noodle block such that the lower end side, which is a part of the sauce portion, is inserted in the opening and the upper end side, which is the remaining part thereof, projects from the sauce-portion arranging surface side.

8 Claims, 7 Drawing Sheets (56) References Cited

FOREIGN PATENT DOCUMENTS

| | | |
|---|---|---|
| JP | 2004-049224 | 2/2004 |
| JP | 2005-269937 | 10/2005 |
| JP | 2006-061113 | 3/2006 |
| JP | 2008-099647 | 5/2008 |
| JP | 3155263 | 10/2009 |
| JP | 2012-044927 | 3/2012 |
| JP | 2012-244945 | 12/2012 |
| JP | 2013-017481 | 1/2013 |
| JP | 2014-064482 | 4/2014 |

OTHER PUBLICATIONS

Extended European Search Report for U.S. Appl. No. 16/758,668, dated Apr. 20, 2018.
International Search Report, PCT/JP2016/050816, dated Apr. 19, 2016.

* cited by examiner

FROZEN FOOD

TECHNICAL FIELD

The present invention relates to a frozen food that is thawed/cooked with a microwave oven, etc.

BACKGROUND ART

Frozen noodle blocks obtained by freezing and hardening heated-and-cooked noodles are known as frozen noodle products which are a type of frozen food. In recent years, frozen noodle blocks have become very popular because frozen noodle blocks can be made edible simply by being heated and cooked with a microwave oven, and a texture close to that immediately after being freshly boiled can be obtained easily in a short time. For example, there are known frozen noodle blocks having a recess for housing seasonings or ingredients, or a groove used at the time of dividing the frozen noodle block.

As regards frozen noodle blocks having a recess, for example, Patent Literature 1 describes: forming a recess of a specific size at the center of a frozen noodle block on the upper surface or lower surface thereof; and covering a portion of the frozen noodle block with an ice film. It is described that the frozen noodle block of Patent Literature 1 is advantageous in that the volume of the recess can be made relatively small and the noodle block can be made compact as a whole because the size of the recess and the amount of moisture adhering to the noodle block as an ice film are designed appropriately. It is also described that: the frozen noodle block can be heated and cooked with a microwave oven in its sealed-and-packaged state; the entire noodle block can be heated with minimal unevenness in a relatively short time; and the texture of the noodles is excellent. Patent Literature 2 describes a production process with which frozen noodle blocks having a recess can be produced efficiently while minimizing the occurrence of cracks and breakage. Patent Literature 3 describes a frozen noodle block having a depression in the center on the upper side and having a ring-shaped ice layer adhering to the periphery of the depression's opening, as a frozen noodle block that can be prepared so as to have substantially the same taste and texture by being cooked either with a microwave oven or a pot. Patent Literatures 1 to 3 mainly disclose techniques related to frozen noodle blocks themselves, and do not particularly describe technical aspects related to sauce products, such as gravy, soups, and various sauces, that are eaten together with noodle blocks obtained by thawing/cooking the frozen noodle blocks.

Patent Literature 4 discloses a frozen noodle product that includes a main noodle block (frozen noodle block) having a central through hole opened in the central section in the top surface and the bottom surface, and a thin disk-shaped sub-ingredient block obtained by freezing and hardening a sub-ingredient such as a food item and/or soup, wherein the sub-ingredient block is arranged so as to close the opening in the frozen noodle block on the top surface side. In the frozen noodle product disclosed in Patent Literature 4, the diameter of the disk-shaped sub-ingredient block is greater than the inner diameter of the central through hole; thus, the sub-ingredient block is not inserted into the central through hole, but the entire sub-ingredient block is located on the top surface of the main noodle block. The frozen noodle product disclosed in Patent Literature 4 was achieved in view of the problem that microwave cooking of frozen noodles gives rise to unevenness in heating and negatively affects texture, and it is described that, according to the frozen noodle product disclosed in Patent Literature 4, the central through hole that is formed in the main noodle block and the sub-ingredient block that closes the central through hole make the heating temperature of the main noodle block uniform during microwave cooking, thus achieving excellent texture.

CITATION LIST

Patent Literature

Patent Literature 1: JP 2014-64482A
Patent Literature 2: JP 2012-244945A
Patent Literature 3: JP 2013-17481A
Patent Literature 4: JP 2005-269937A

SUMMARY OF INVENTION

The present invention is a frozen food including: a main food portion obtained by freezing and hardening a cooked food; and a sauce portion obtained by freezing and hardening a sauce to be eaten together with the cooked food. The main food portion has a sauce-portion arranging surface on which the sauce portion is arranged. An opening is formed in the sauce-portion arranging surface. The sauce portion is arranged on the main food portion such that a part of the sauce portion is inserted in the opening and the remaining part thereof projects from the sauce-portion arranging surface side.

The present invention is also a process for producing the aforementioned frozen food according to the present invention, the process for producing the frozen food involving the following steps 1 to 3.

Step 1: A step of arranging the cooked food on an inner bottom surface of a container whose inner bottom surface is provided with a projection having the same planar-view shape as the opening, the cooked food being arranged on the inner bottom surface so as to surround the projection to thereby obtain a food-housing member that has, on an upper surface thereof, an exposed portion of the projection.

Step 2: A sauce-placing step of placing the aforementioned sauce that has been blended with a gelling agent onto the projection's exposed portion, and its periphery, on the upper surface of the food-housing member.

Step 3: A step of freezing the food-housing member that has undergone the sauce-placing step.

BRIEF DESCRIPTION OF DRAWINGS

FIGS. 7(*a*) and 7(*b*) are views corresponding to FIG. 2 of frozen foods that are outside the scope of the present invention.

FIGS. 12(*a*) to 12(*f*) are plan views schematically illustrating the lower surface side (the side opposite from the sauce-portion arranging surface) of other embodiments of the frozen food of the present invention.

DESCRIPTION OF EMBODIMENTS

Patent Literatures 1 to 4 mainly focus on improving the texture etc. of the frozen noodle block itself, and do not particularly describe characteristics deemed important in foods, such as spaghetti, that are eaten by combining/covering noodles with a sauce, such as the sense of unity between the noodles and the sauce and the texture etc. of the noodles when combined/covered with the sauce. There has yet to be provided a frozen food that offers an excellent sense of unity between noodles and a sauce simply by being heated and cooked with a microwave oven.

The present invention relates to a frozen food including a cooked food and a sauce eaten together therewith, and offering an excellent sense of unity between the food and the sauce and excellent texture when thawed/cooked and eaten.

Figure 1:
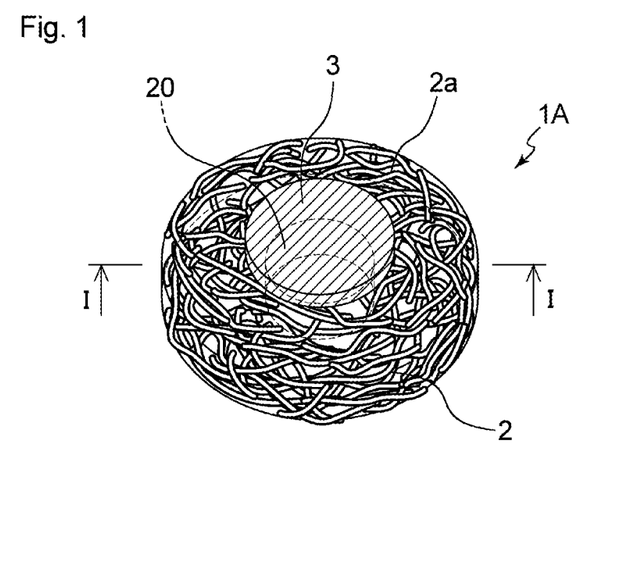
FIG. 1 is a perspective view schematically illustrating an example of a frozen noodle product which is an embodiment of a frozen food of the present invention.
Figure 2:
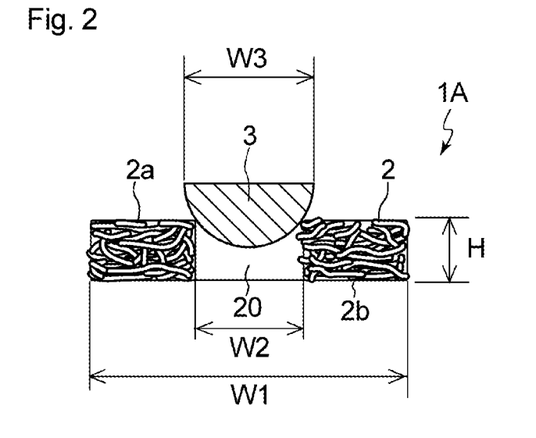
FIG. 2 is a cross-sectional view that schematically illustrates a cross section along line I-I of FIG. 1, and that is along the thickness direction of the frozen noodle product.

The present invention is described below according to preferred embodiments thereof with reference to the drawings. FIGS. 1 and 2 illustrate a frozen noodle product 1A which is an embodiment of a frozen food of the present invention. The frozen noodle product 1A includes: a frozen noodle block 2 as a main food portion obtained by freezing and hardening a cooked food; and a sauce portion 3 obtained by freezing and hardening a sauce to be eaten together with the cooked food.

The "cooked food" according to the present invention is a food whose foods have been subjected to cooking, such as heating, until edible, and can be eaten as-is. The types of ingredients are not particularly limited, with examples including noodles, rice bowl dishes, curry rice, stews, and Omu-rice (omelet stuffed with fried rice); one type of such foods may be employed alone, or two or more types may be employed in combination. Examples of ways of cooking the ingredients include, although not particularly limited to, boiling, simmering, steaming, grilling, pan-frying/sautéing, deep-frying, smoking, and tossing. The conditions for cooking may be selected as appropriate depending on the types of ingredients, etc.

"Sauce" according to the present invention is a food product having flowability at atmospheric temperature (25° C.), and is usually a liquid or a fluid mainly consisting of water/moisture. As described further below, the present invention encompasses embodiments wherein a gelling agent is blended with a sauce which serves as a material in a step of producing a sauce portion according to the present invention; herein, a sauce "having flowability at atmospheric temperature" refers to a sauce before being blended with a gelling agent in such embodiments. The type of sauce is selected as appropriate depending on the cooked food to be eaten together with the sauce, and is not particularly limited. Sauces may include solid ingredients, such as vegetables, meat, and fishery products. For example, in case where the cooked food is spaghetti (boiled noodles), examples of sauces include meat sauce, white sauce, Neapolitan-style sauce, and curry sauce. Examples of raw ingredients of sauces include: water; cow milk; salt; table sugar; eggs; fresh cream; pastes of vegetables such as tomatoes and onions, and beans such as peas; purées of vegetables and beans; and seasonings such as soy sauce, vinegar, bouillon, and consommé. One type of raw ingredient may be used alone, or two or more types may be used in combination. In addition to the raw ingredients, if necessary, sauces may include additives conventionally used as sauce ingredients, such as acidulants, emulsifiers, thickening agents, stabilizers, and colorants, and the additives may be selected as appropriate depending on the type of sauce.

The frozen noodle block 2 (main food portion) is obtained by freezing and hardening a heated-and-cooked noodle product. A "noodle product" according to the present invention includes, for example, Chinese noodles, udon (thick wheat flour noodles), buckwheat noodles, hiya-mugi (medium-thickness wheat flour noodles), so-men (thin wheat flour noodles), rice noodles, bean threads, and various pastas such as spaghetti and macaroni. Examples of ways to heat/cook noodle products are as described above. A typical example of a "heated-and-cooked noodle product" is boiled noodle. Boiled noodles are obtained by boil-cooking fresh noodles, dried noodles, or frozen noodles. After boil-cooking, the boiled noodles may be subjected to treatments, such as draining, water rinsing, and cooling, as necessary.

As illustrated in FIGS. 1 and 2, the frozen noodle block 2 has a sauce-portion arranging surface 2*a* on which the sauce portion 3 is arranged, and an opening 20 is formed in the sauce-portion arranging surface 2*a*. More specifically, the frozen noodle block 2 has a substantially circular-cylindrical shape with a relatively low height, and has an upper surface 2*a* and a lower surface 2*b* opposing the upper surface, wherein the upper surface 2*a* constitutes the sauce-portion arranging surface 2*a*.

In a planar view, the opening 20 is substantially circular. In the present embodiment, the opening 20 penetrates the frozen noodle block 2 in the thickness direction (the vertical direction in FIG. 2), and the lower surface 2*b*, which is the surface on the opposite side from the sauce-portion arranging surface 2*a* of the frozen noodle block 2, is also opened. Stated differently, the frozen noodle block 2 has a substantially annular ring-like shape. The opening 20 is formed in the central section of both the sauce-portion arranging surface 2*a* and the lower surface 2*b*. The opening length W2 of the opening 20 is constant over the entire length, in the thickness direction, of the frozen noodle block 2, and the opening on the sauce-portion arranging surface 2*a* side of the opening 20 and the opening on the lower surface 2*b* side have the same shape and same size.

The aforementioned "opening length of the opening" refers to the maximum length of the opening 20 in a planar view; in cases where the planar-view shape of the opening 20 is circular, i.e., isotropic, as in the present embodiment, the "opening length" is the diameter of the circle. Although not illustrated, in cases where the planar-view shape of the opening 20 is anisotropic, such as elliptic or rectangular, the opening length of the opening 20 is the length (maximum length) of the longest section in a planar view.

The frozen noodle block 2 can be produced according to processes similar to those for producing known frozen noodle blocks having an opening (depression or recess). More specifically, for example, the frozen noodle block 2 can be produced by: housing a given amount of boil-cooked noodles inside a mold having, in the center on its bottom portion, a projection for forming an opening; and quick-freezing or slow-freezing the noodles. The section corresponding to the mold's projection in the thus-produced frozen noodle block becomes the opening. Thus, the shape and size of the opening can be adjusted by adjusting the shape and size of the projection. Conventional techniques may be employed as appropriate for freezing means.

The dimensions of various sections of the frozen noodle block 2 are not particularly limited, but usually, the length W1 (cf. FIG. 2) in the planar direction orthogonal to the thickness direction is from 50 to 200 mm, the opening length W2 (cf. FIG. 2) of the opening 20 is from 20 to 120 mm, and the thickness (height) H (cf. FIG. 2) is from 15 to 40 mm. In the present embodiment, the lengths W1 and W2 are the same between the sauce-portion arranging surface 2a and the lower surface 2b, but in the present invention, the lengths W1 and W2 may be different between the sauce-portion arranging surface 2a and the lower surface 2b. The weight of the frozen noodle block 2 is not particularly limited, but usually, the frozen noodle block is for a single serving, so the weight is from about 80 to 500 g.

The aforementioned "length in the planar direction" is the maximum value of the length of an object (frozen noodle block 2, sauce portion 3, etc.) in the planar direction which is orthogonal to the thickness direction, i.e., the maximum length of an object in a planar view. For example, in cases where the planar-view shape of the frozen noodle block 2 (or the sauce portion 3) is circular, i.e., isotropic, as in the present embodiment, the "length" is the diameter (outer diameter) of the circle. Further, for example, in cases where the planar-view shape of the frozen noodle block 2 (or the sauce portion 3) is anisotropic, such as elliptic or rectangular, the length in the planar direction of the frozen noodle block 2 (or the sauce portion 3) is the length (maximum length) of the longest section in a planar view.

As illustrated in FIG. 1, the sauce portion 3 is circular in a planar view, and, as illustrated in FIG. 2, has a section whose length W3 in the planar direction gradually decreases toward the lower end side (i.e., toward the leading end side in the insertion direction into the opening 20). More specifically, the sauce portion 3 has a length W3 in the planar direction that gradually decreases from the upper end toward the lower end, and has a gently-curved dome-like shape that projects toward the lower end side. Stated differently, the sauce portion 3 is substantially semicircular in a cross-sectional view along the thickness direction of the sauce portion 3, as illustrated in FIG. 2.

The sauce portion 3 can be produced according to processes similar to those for producing known frozen sauces. More specifically, for example, the sauce portion 3 can be produced by: housing a given amount of sauce having flowability at atmospheric temperature inside a container having a desired internal shape; and quick-freezing or slow-freezing the sauce. The dimensions of the sauce portion 3 are not particularly limited, but usually, the maximum value of the length W3 in the planar direction (cf. FIG. 2), i.e., the maximum length (diameter) of the upper surface, is from 30 to 130 mm, and the thickness (height) is from 15 to 600 mm. In the present embodiment, the maximum value of the length W3, in the planar direction, of the sauce portion 3 is shorter than the length W1, in the planar direction, on the sauce-portion arranging surface 2a side of the frozen noodle block 2, but in the present invention, the maximum value of the length W3 of the sauce portion 3 may be the same as, or longer than, the length W1 on the sauce-portion arranging surface 2a side of the frozen noodle block 2. The weight of the sauce portion 3 is not particularly limited, but usually, the sauce portion is for a single serving, so the weight is from about 30 to 400 g.

A primary feature of the frozen noodle product 1A of the present embodiment is that the sauce portion 3 is arranged on the frozen noodle block 2, which is the main food portion, such that a part of the sauce portion is inserted in the opening 20 and the remaining part thereof projects from the sauce-portion arranging surface 2a side. In the present embodiment, as illustrated in FIG. 2, the lower end side (the lower end and its vicinity) of the sauce portion 3 is inserted in the opening 20, and the upper end side (the upper end (upper surface) and its vicinity) projects from the sauce-portion arranging surface 2a side. Further, the sauce portion 3 contacts the frozen noodle block 2 at an opening edge portion (corner portion) of the opening 20 on the sauce-portion arranging surface 2a side, and does not contact the frozen noodle block 2 at sections other than the opening edge portion. The lower end of the sauce portion 3 is located between the sauce-portion arranging surface (upper surface) 2a and the lower surface 2b of the frozen noodle block 2, and is separated from the lower surface 2b.

Figure 7A:
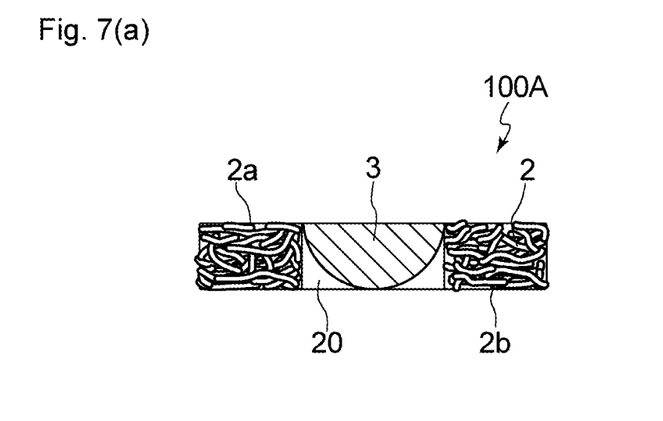
Figure 7B:
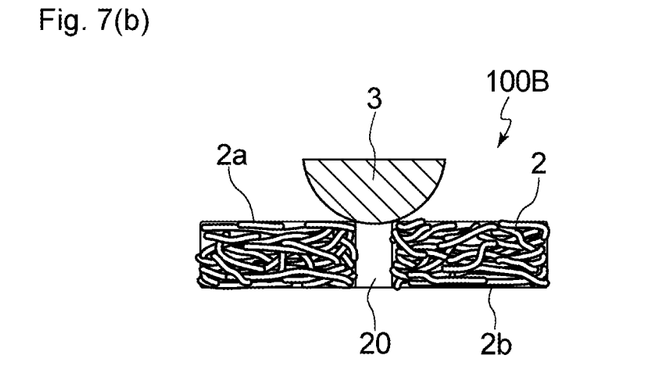

As described above, the sauce portion 3 is arranged with respect to the frozen noodle block 2 such that a part of the sauce portion 3 is inserted in the opening 20 and the remaining part thereof projects from the sauce-portion arranging surface 2a side. Thus, when the thus-arranged frozen noodle product 1A is thawed/cooked and eaten, it is possible to obtain a cooked noodle product having an excellent sense of unity between the noodle product and the sauce and in which the noodles have a smooth texture and moderate resilience. The reason why the aforementioned arrangement is effective in improving characteristics such as the sense of unity between the noodle product and the sauce is undetermined, but it is surmised that moisture is transferred from the sauce to the noodles when the noodle product is thawed with a microwave oven, which prevents the clinging/combining of the sauce to the noodles from deteriorating. In a configuration where the entire sauce portion 3 is inserted in the opening 20 of the frozen noodle block 2 as in the frozen noodle product 100A illustrated in FIG. 7(*a*) (the percentage of the opening occupied by the sauce portion: 100%), or in a configuration where no part of the sauce portion 3 is inserted in the opening 20 of the frozen noodle block 2 as in the frozen noodle product 100B illustrated in FIG. 7(*b*) (the percentage of the opening occupied by the sauce portion: 0%), it is not possible to expect improvements in texture and the sense of unity between the noodle product and the sauce.

From the viewpoint of achieving the aforementioned effects more reliably, it is preferable that the proportion of the volume of the sauce portion 3 inserted in the opening 20 with respect to the entire volumetric capacity of the opening 20 of the frozen noodle block 2, i.e., the percentage of the opening occupied by the sauce portion, is preferably from 5 to 97.5%, more preferably from 20 to 50%. It should be noted that, in the present invention, unless specifically described otherwise, the volume of the frozen noodle block, or the volumetric capacity of the opening, refers to the volume (volumetric capacity) including the noodle strands and gaps among the noodle strands, and no consideration is given to the recesses/depressions formed among the noodle strands. For example, in cases where the opening 20 is circular-cylindrical as in the present embodiment, the volumetric capacity of the opening 20 is assumed to be the minimum circular cylinder encompassing the entire opening 20, and is defined as the volume of that circular cylinder. The percentage of the opening occupied by the sauce portion is calculated by the following equation:

Percentage of opening occupied by sauce portion (%)=(Volume of sauce portion included in opening/Volumetric capacity of opening)×100.

FIGS. 3 to 6 illustrate other embodiments of the frozen food of the present invention. The following description on the other embodiments mainly focuses on features that are different from those of the frozen noodle product 1A of the foregoing embodiment, and like features are accompanied by the same reference numbers and explanation thereon is omitted. The explanation given for the frozen noodle product 1A applies as appropriate to features that are not particularly explained.

Figure 3:
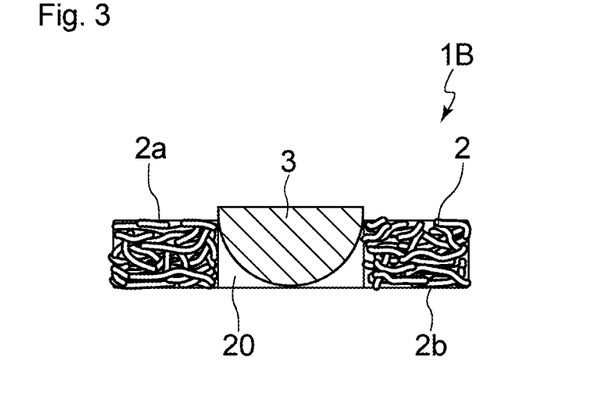
FIG. 3 is a view corresponding to FIG. 2 of another embodiment of the frozen food of the present invention.

In the frozen noodle product 1B illustrated in FIG. 3, the lower end of the sauce portion 3 is located at the same position as the lower surface 2b of the frozen noodle block 2; sections other than the upper end portion (the upper surface and its vicinity) of the sauce portion 3 are inserted in the opening 20, and the upper end portion of the sauce portion 3 projects from the sauce-portion arranging surface 2a side. This frozen noodle product 1B achieves the same effects as the frozen noodle product 1A, but it is more preferable that the lower end of the sauce portion 3 is located between the sauce-portion arranging surface (upper surface) 2a and the lower surface 2b of the frozen noodle block 2 (i.e., separated from the lower surface 2b), as in the frozen noodle product 1A illustrated in FIG. 2.

Figure 4:
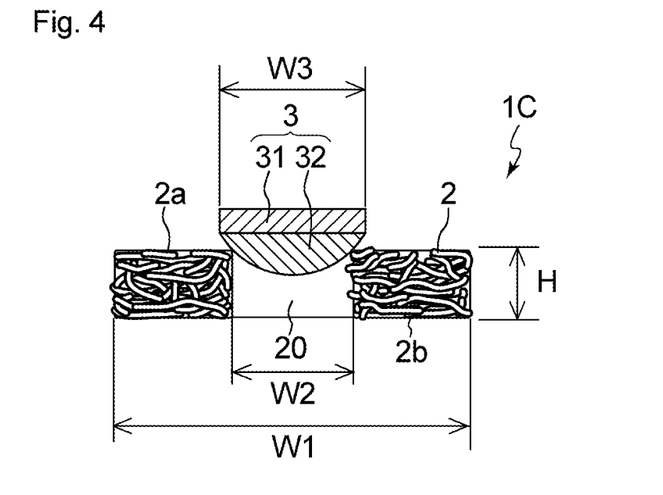
FIG. 4 is a view corresponding to FIG. 2 of yet another embodiment of the frozen food of the present invention.

In the frozen noodle product 1C illustrated in FIG. 4, the sauce portion 3 includes, in the thickness direction (the vertical direction in FIG. 4), a large diameter portion 31 whose length W3 in the planar direction is relatively long, and a small diameter portion 32 whose length W3 in the planar direction is relatively short, and the length W3 in the planar direction differs in part. The large diameter portion 31 constitutes the upper portion of the sauce portion 3, and the small diameter portion 32 constitutes the lower portion of the sauce portion 3. The large diameter portion 31 and the small diameter portion 32 are inseparably integrated, and the sauce portion 3 is continuous in the thickness direction. It should be noted that, in FIG. 4, the large diameter portion 31 and the small diameter portion 32 are hatched differently from the viewpoint of easy distinguishability, but this is irrelevant to whether these portions actually look different or not.

The large diameter portion 31 and the small diameter portion 32 have the same planar-view shape and are both circular. The large diameter portion 31 has a disk-like shape in which the length W3 in the planar direction (i.e., the diameter) is constant over the entire length in the thickness direction. On the other hand, the small diameter portion 32's length W3 in the planar direction (i.e., diameter) gradually decreases toward the lower end side (i.e., toward the leading end side in the insertion direction into the opening 20), that is, gradually decreases as the distance from the large diameter portion 31 increases, and the small diameter portion 32 has a gently-curved dome-like shape that projects toward the lower end side. Stated differently, the contour of the small diameter portion 32 is arc-shaped in a cross-sectional view along the thickness direction of the sauce portion 3 as illustrated in FIG. 4. There is no particular limitation to the thickness ratio (height ratio) between the large diameter portion 31 and the small diameter portion 32, but it is preferable that, when the entire sauce portion 3 is divided into ten equal parts in the thickness (height) direction, the ratio between the large diameter portion and the small diameter portion (former:latter) is from 1:9 to 5:5.

In the frozen noodle product 1C, a portion (lower end side) of the small diameter portion 32 is inserted in the opening 20, and the entire large diameter portion 31 projects from the sauce-portion arranging surface 2a side. The large diameter portion 31's length W3 in the planar direction is constant over the entire length in the thickness direction, and the large diameter portion 31's length W3 in the planar direction is longer than the opening length W2 of the opening 20 on the sauce-portion arranging surface 2a side (the diameter of the opening 20 in the present embodiment) (i.e., W3>W2), and thus, the large diameter portion 31 cannot be inserted into the opening 20. On the other hand, the small diameter portion 32 of the sauce portion 3 has a dome-like shape whose diameter gradually decreases toward the lower end side, and its planar-direction length W3 at least on the lower end side (the lower end portion and its vicinity) is shorter than the opening length W2 of the opening 20 on the sauce-portion arranging surface 2a side (W3<W2), and thus, the lower end side is inserted in the opening 20. The lower end of the small diameter portion 32 is located between the sauce-portion arranging surface (upper surface) 2a and the lower surface 2b of the frozen noodle block 2 and is separated from the lower surface 2b. The frozen noodle product 1C also achieves the same effects as the frozen noodle product 1A.

Figure 5:
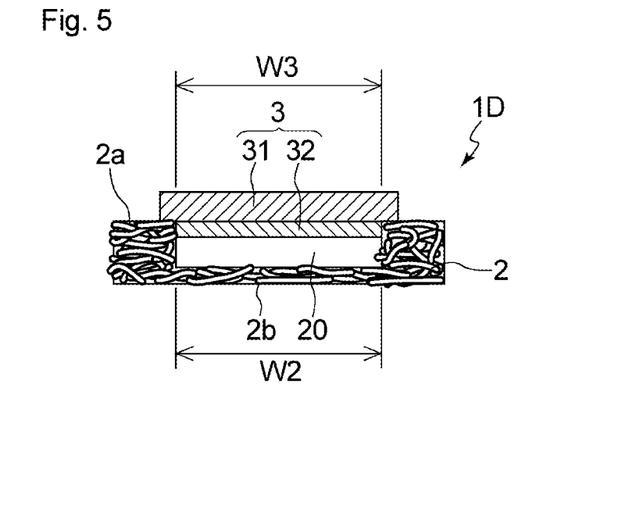
FIG. 5 is a view corresponding to FIG. 2 of yet another embodiment of the frozen food of the present invention.

In the frozen noodle product 1D illustrated in FIG. 5, the small diameter portion 32's length W3 in the planar direction is constant over the entire length in the thickness direction, like the large diameter portion 31. Further, the planar-direction length W3 of the small diameter portion 32 of the frozen noodle product 1D is substantially the same as, or shorter than, the opening length W2 of the opening 20 on the sauce-portion arranging surface 2a side (the opening 20's diameter in the present embodiment), and the entire small diameter portion 32 is inserted in the opening 20. Further, in the frozen noodle product 1D, the opening 20 is not a through hole, but is a depression (recess) having a bottom portion on the lower surface 2b side of the frozen noodle block 2. The lower end of the sauce portion 3 (small diameter portion 32) does not reach the bottom portion of the opening 20, and is located at a distance from the bottom portion (lower surface 2b). The frozen noodle product 1D also achieves the same effects as the frozen noodle product 1A.

The aforementioned frozen noodle products 1A to 1D can be produced by separately producing the frozen noodle block 2 (i.e., the main food portion obtained by freezing and hardening a cooked food) and the sauce portion 3 (i.e., a frozen-and-hardened product of a sauce eaten together with the cooked food), and arranging the sauce portion 3 on the sauce-portion arranging surface 2a of the frozen noodle block 2 so as to cover the opening 20 of the sauce-portion arranging surface 2a.

The frozen food of the present invention can not only be produced by a production process of combining a main food portion and a sauce portion which are both in a frozen state as described above, but can also be produced by a production process of first combining a cooked main food portion and a sauce portion which are neither in a frozen state, and then freezing the two integrally. As a concrete example of the latter production process, a frozen food production process of the present invention involving the aforementioned steps 1 to 3 is described below, taking a process for producing the aforementioned frozen noodle product 1A illustrated in FIGS. 1 and 2 as an example.

Figure 8:
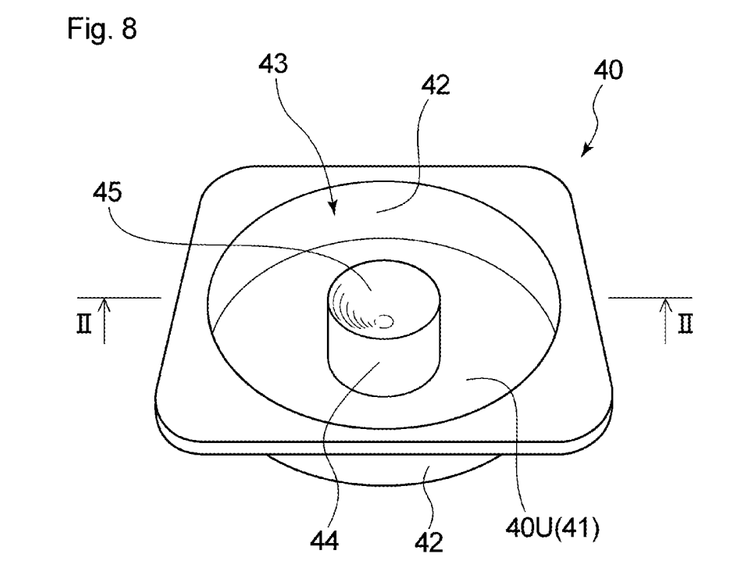
FIG. 8 is a perspective view schematically illustrating an example of a container used for performing a process for producing a frozen food of the present invention.
Figure 9:
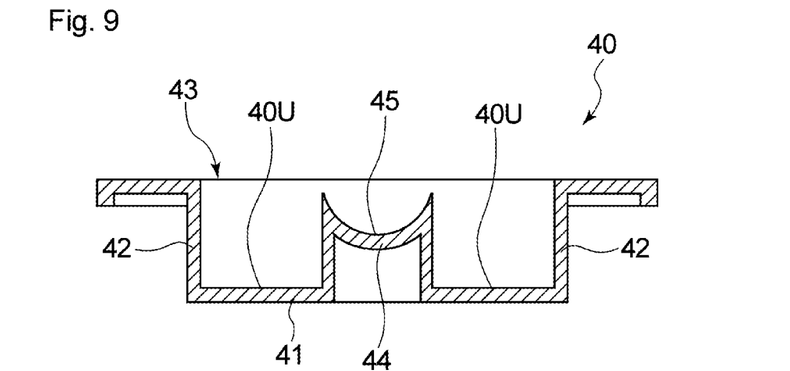
FIG. 9 is a cross-sectional view schematically illustrating a cross section along line II-II of FIG. 8.

FIGS. 8 and 9 illustrate a container 40 used for arranging a cooked food (cooked noodle product 2') in the aforementioned step 1. The container 40 is a tray-shaped container including: a bottom wall 41 forming an inner bottom surface 40U; a peripheral wall 42 provided so as to stand upright from the peripheral edge of the bottom wall; and an upper opening 43. The interior of the container 40 is formed in a shape corresponding to the outer shape of the frozen noodle block 2 of the frozen noodle product 1A, which is the target product; more specifically, the container interior has a circular-cylindrical shape like the frozen noodle block 2, and the inner bottom surface 40U on which the frozen noodle block 2 (boil-cooked noodles before being frozen) is placed is circular in a planar view.

A projection 44 for forming the opening 20 in the frozen noodle block 2 is formed in the central section on the inner bottom surface 40U of the container 40. The projection 44 is formed by projecting and deforming the central section of the bottom wall 41 toward the upper opening 43 side, and is hollow. The height of the projection 44 from the inner bottom surface 40U is the same as, or lower than, the height of the peripheral wall 42 from the inner bottom surface 40U. In the embodiment illustrated in FIG. 9, the projection 44 is relatively lower in height. The projection 44 has a shape corresponding to the shape of the opening 20, and more specifically, has the same planar-view shape as the opening 20, and is substantially circular-cylindrical in the present embodiment.

A recessed portion 45 that is recessed in a concave shape is formed in the top portion of the projection 44. The recessed portion 45 functions as a section for receiving a sauce which is a material of the sauce portion 3 of the frozen noodle product 1A, and helps to physically separate the sauce from the cooked food (cooked noodle product 2') housed in the container 40. The recessed portion 45 is circular in a planar view, and is semicircular (arc-shaped) in a cross-sectional view along the height direction of the projection 44, as illustrated in FIG. 9. The bottom portion of the recessed portion 45 is located at a higher position than the inner bottom surface 40U.

Figure 10:
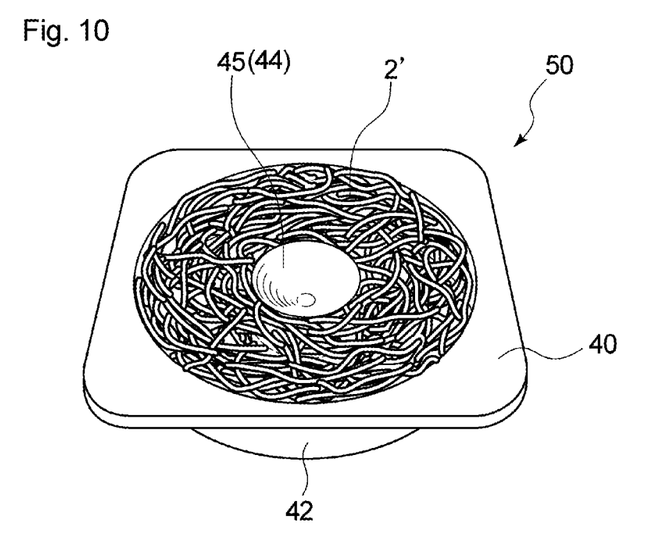
FIG. 10 is a schematic perspective view of a food-housing member, i.e., a state in which cooked food is arranged in the container illustrated in FIG. 8.

First, in the aforementioned step 1, a food-housing member 50, in which a food before being frozen is housed in the aforementioned container 40 as illustrated in FIG. 10, is obtained by arranging a heated-and-cooked (for example, boil-cooked) noodle product 2', which is a cooked food serving as a material of the frozen noodle block 2, on the inner bottom surface 40U of the container 40. The cooked noodle product 2' is arranged onto the container 40 such that the cooked noodle product 2' is arranged so as to surround the projection 44; i.e., the cooked noodle product 2' is placed in sections on the inner bottom surface 40U other than the projection 44 and no cooked noodle product 2' is placed on the recessed portion 45 of the projection 44. The amount of the cooked noodle product 2' to be housed in the container 40 is usually an amount whereby the cooked noodle product 2' covers substantially the entire region on the inner bottom surface 40U other than the section of the projection 44 and whereby the height, from the inner bottom surface 40U, of the cooked noodle product 2' housed in the container 40 exceeds the height of the projection 44. In cases where the height, from the inner bottom surface 40U, of the cooked noodle product 2' housed in the container 40 exceeds the height of the projection 44, the "upper surface of the food-housing member 50", on which a gelling-agent-blended sauce 3' is placed in the next step, will be constituted by the cooked noodle product 2', and the sauce 3' will not contact the projection 44 but instead directly contact the cooked noodle product 2', thereby further improving the stability of arranging the sauce 3', and by extension the sauce portion 3 which is the frozen/hardened product of the sauce 3', and also leading to an improvement in production efficiency. In cases where the height, from the inner bottom surface 40U, of the cooked noodle product 2' housed in the container 40 does not exceed the height of the projection 44, the top portion of the projection 44 will project from the upper surface of the cooked noodle product 2'; a configuration wherein a sauce 3' is placed on the thus-projecting top portion of the projection 44 is slightly inferior in the stability of arranging the sauce 3' compared to the aforementioned configuration wherein the sauce 3' directly contacts the cooked noodle product 2'. Nevertheless, care should be taken such that, even in cases where the cooked noodle product 2' is housed in the container 40 such that the height thereof, from the inner bottom surface 40U, exceeds the height of the projection 44, the cooked noodle product 2' is not placed on the top portion of the projection 44 (i.e., does not enter the recessed portion 45). In a food-housing member 50 obtained in this way, substantially the entire top portion (recessed portion 45) of the projection 44 is exposed in a top view, and the projection 44 has an exposed portion.

Figure 11:
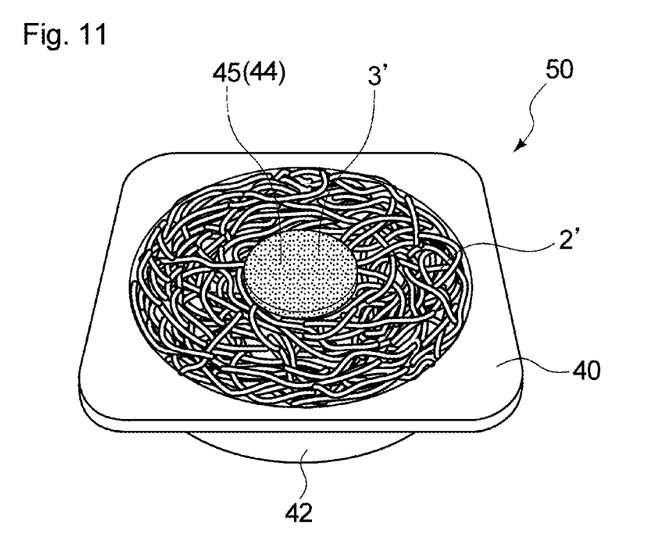
FIG. 11 is a perspective view schematically illustrating a state in which a sauce is placed on the upper surface of the food-housing member illustrated in FIG. 10.
Figure 12A:
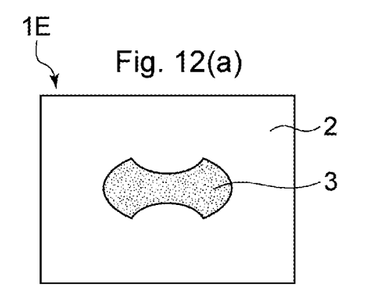
Figure 12B:
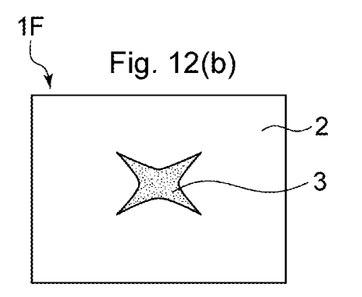
Figure 12C:
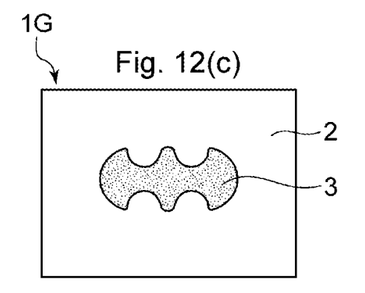
Figure 12D:
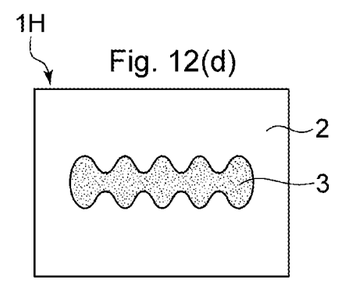
Figure 12E:
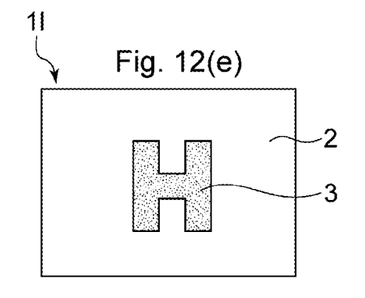
Figure 12F:
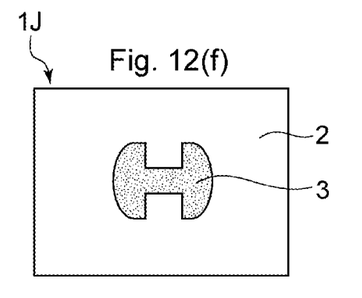

Next, in the aforementioned step 2, as illustrated in FIG. 11, a sauce 3' that has been blended with a gelling agent is placed onto the projection 44's exposed portion, and its periphery, on the upper surface of the food-housing member 50 (sauce-placing step). After the sauce-placing step, the projection 44 in the food-housing member 50 is completely covered by the sauce 3', and the exposed portion of the projection 44 disappears.

By blending the sauce 3' with a gelling agent, flowability is intentionally reduced and shape retainability is enhanced. A sauce 3' with such characteristics is less likely to flow after being placed on the projection 44's exposed portion, and its periphery, on the upper surface of the food-housing member 50, and is thus likely to stay where it is initially placed. Thus, the cooked noodle product 2' and the sauce 3' are prevented from getting mixed before being frozen in the next step. This thereby suppresses degradation in texture caused, for example, by moisture in the sauce 3' being transferred to the cooked noodle product 2', thus making it possible to further improve the quality of the ultimately-obtained frozen noodle product 1A. Further, it is unnecessary to take special care in terms of spreading caused by the flowing of the sauce 3' after being placed on the food-housing member 50, and thus, an improvement in the efficiency of producing frozen noodle products 1A can be expected.

As for the gelling agent to be used in the invention, any gelling agent conventionally used with the aim of reducing flowability of food may be employed without particular limitation. Examples of gelling agents include agar, gelatin, collagen peptides, and thickening polysaccharides. One type of gelling agent may be used alone, or two or more types may be used in combination. Examples of gelatin that may be used include animal-derived gelatin prepared from, for example, beef bone, beef skin, shark cartilage, pork bone, or pork skin, and commercially-available edible gelatin. Examples of collagen peptides that may be used include hydrolysates of animal-derived gelatin or collagen prepared from, for example, beef bone, beef skin, shark cartilage, pork bone, or pork skin, and commercially-available edible collagen peptides. Examples of thickening polysaccharides include carrageenan, xanthan gum, gellan gum, tamarind gum, guar gum, locust bean gum, gum arabic, tragacanth gum, karaya gum, pectin, carboxymethyl cellulose, glucomannan, soybean polysaccharide, pregelatinized starch, and pregelatinized processed starch. Among the aforementioned gelling agents, gelatin, in particular, is preferably used in the present invention because excellent results can be obtained in terms of texture and taste when the frozen food is eaten.

Methods for placing a sauce 3' onto the upper surface of the food-housing member 50 include: (1) a method of placing a shaped product of a sauce 3' that has been shaped into a predetermined shape in advance (referred to hereinafter also as "first method"); and (2) a method of placing a sauce 3' having flowability onto the food-housing member 50 by, for example, directly discharging a sauce 3' from an injector etc. toward the upper surface of the food-housing member 50 (referred to hereinafter also as "second method").

In the aforementioned first method, it is necessary to prepare, in advance, a shaped product of a sauce 3' to be placed on the upper surface of the food-housing member 50. A shaped product of a sauce 3' can be obtained, for example, by filling a separately-prepared shaping container (not illustrated) with a sauce 3' immediately after being blended with a gelling agent and having flowability, and then causing the sauce 3' to gel by refrigerating the shaping container and leaving the container still for a predetermined time as necessary. The refrigeration temperature for the gelling-agent-containing sauce 3' is preferably from 10 to 15° C. In the aforementioned first method, the content of the gelling agent in the sauce 3' is preferably from 1 to 10 mass %, more preferably from 3 to 7 mass %, with respect to the total mass of the sauce 3'. If the gelling agent content is too low, it is difficult to form a shaped product from the sauce. On the other hand, if the gelling agent content is too high, a significant reduction in flowability may impair the sauce's fillability into a shaping container, and also, many bubbles may get trapped in the sauce shaped product, which may impair the sauce's quality.

The shaped product of the sauce 3' is then subjected to a freezing treatment and eventually becomes the sauce portion 3; thus, usually, the shape of the shaped product of the sauce 3' is reflected to the shape of the sauce portion 3 substantially directly. As for the sauce portion 3, in the frozen noodle product 1A described above, it is necessary to "arrange the sauce portion 3 with respect to the frozen noodle block 2 such that a portion of the sauce portion 3 is inserted in the opening and the remaining portion thereof projects from the sauce-portion arranging surface 2a side", and thus, the sauce portion 3 needs to have a shape capable of achieving this specific arrangement. So, the shape of the shaped product of the sauce 3', which may be considered a precursor of the sauce portion 3, is preferably shaped with consideration given to the aforementioned specific arrangement. The shape of the shaped product of the sauce 3' is determined by the inner shape of the aforementioned shaping container; so, it is desirable to appropriately design the shape, dimensions, etc., of the shaping container with consideration given the shape of the sauce portion 3 capable of achieving the aforementioned specific arrangement.

On the other hand, in the aforementioned second method, a sauce 3' immediately after being blended with a gelling agent and having flowability (i.e., still having flowability even though its flowability has been reduced compared to before being blended with a gelling agent) is placed directly onto the upper surface of the food-housing member 50, in contrast to the aforementioned first method in which a shaped product of a sauce 3' having substantially no flowability is placed on the upper surface of the food-housing member 50. In the second method, the content of gelatin in the sauce 3' to be placed on the upper surface of the food-housing member 50 is preferably from 1 to 10 mass %, more preferably from 3 to 7 mass %, with respect to the total mass of the sauce 3'. By setting the content of gelatin in the sauce 3' within the aforementioned range, when the sauce 3' is placed in a predetermined position (the projection 44's exposed portion and its periphery) on the upper surface of the food-housing member 50, the sauce 3' is likely to stay where it is initially placed while retaining a certain shape, without spreading to the periphery from its initially-placed position. It is also preferable to refrigerate the sauce 3' in advance before placing it on the food-housing member 50, because this, combined with the effect of gelatin included in the sauce, further improves the shape retainability of the sauce 3' after it is placed on the food-housing member 50. Note that, after placing the sauce 3' on the food-housing member 50, it is preferable to avoid integrally refrigerating the entire food-housing member 50 on which the sauce 3' has been placed, because the quality of the food in the food-housing member 50 may deteriorate.

Next, in the aforementioned step 3, the food-housing member 50 (cf. FIG. 11) that has undergone the aforementioned step 2 (the sauce-placing step) is frozen. The freezing method is not particularly limited, and either quick-freezing or slow-freezing may be employed. The freezing temperature is usually from −18 to −40° C. Through this freezing treatment, the cooked noodle product 2' in the food-housing member 50 is frozen and hardened and is made into a frozen noodle block 2 (main food portion), and the sauce 3' is frozen and hardened and is made into a sauce portion 3. Then, the frozen noodle block 2 and the sauce portion 3 are removed from the container 40, to obtain the intended frozen noodle product 1A as illustrated in FIGS. 1 and 2. The sauce portion 3 in the thus-obtained frozen noodle product 1A includes a gelling agent, and the content of the gelling agent is as described in the explanation on the aforementioned first and second methods.

Figure 6A:
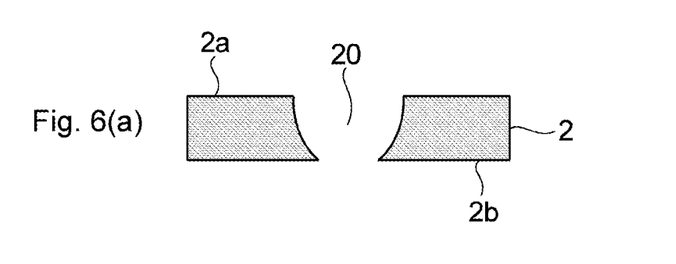
FIGS. 6(a) and 6(b) are cross-sectional views (corresponding to FIG. 2) along the thickness direction of other embodiments of a main food portion according to the present invention.
Figure 6B:
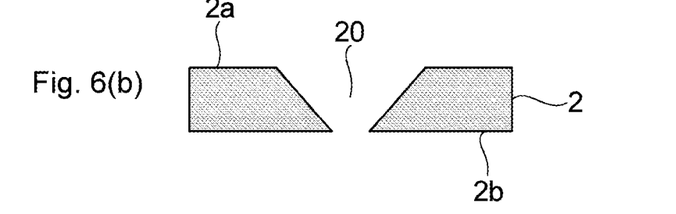

The present invention has been described above according to preferred embodiments thereof, but the present invention is not limited to the foregoing embodiments. In the foregoing embodiments, the opening length W2 of the opening 20 in the main food portion (frozen noodle block) 2 is constant over the entire length, in the thickness direction, of the main food portion 2, but the opening length W2 does not have to be constant. For example, as illustrated in FIGS. 6(a) and 6(b), the opening may have a "tapered shape that becomes narrow toward below in a cross-sectional view along the thickness direction", wherein the opening length W2 gradually decreases as the distance from the upper surface (sauce-portion arranging surface) 2a of the main food portion 2 increases (i.e., gradually decreases toward below). Alternatively, opposite from the configurations illustrated in FIG. 6, the opening may have a "tapered shape that becomes narrow toward above in a cross-sectional view along the thickness direction", wherein the opening length W2 gradually decreases as the distance from the lower surface 2b increases (i.e., gradually decreases toward above). In the opening 20 illustrated in FIG. 6(a), the wall surface defining the opening 20 is curved in a cross-sectional view along the thickness direction, whereas in the opening 20 illustrated in FIG. 6(b), the wall surface is rectilinear in the same cross-sectional view and forms a tapered shape.

The planar-view shape of each of the main food portion (frozen noodle block) 2, the opening 20, and the sauce portion 3 is not particularly limited and may be selected discretionarily; other that the circular shape in the foregoing embodiments, the planar-view shape may be quadrangular or elliptic. The planar-view shape of the main food portion 2 may be different from that of the opening 20 and/or the sauce portion 3. FIGS. 12(a) to 12(f) schematically illustrate the lower surface 2b side (the side opposite from the sauce-portion arranging surface) of other embodiments of the frozen food of the present invention. Each of the frozen noodle products 1E to 1J illustrated in FIG. 12 has a frozen noodle block 2 (main food portion) with a rectangular planar-view shape and a sauce portion 3, and also has an opening 20 formed in the central section of the frozen noodle block 2 so as to penetrate the same in the thickness direction, and the sauce-portion arranging surface side of the opening 20 is closed by the sauce portion 3. As in the foregoing embodiment, in the frozen noodle products 1E to 1J, the sauce portion 3 is arranged on the frozen noodle block 2 such that a portion of the sauce portion is inserted in the opening 20 and the remaining portion thereof projects from the sauce-portion arranging surface side. In the frozen noodle products 1E to 1J, only the planar-view shapes of the openings 20 are different from one another. Features provided in only one of the foregoing embodiments are all mutually applicable as appropriate.

EXAMPLES

Examples are given below to describe the present invention in detail, but the present invention is not limited to the following Examples.

Examples 1 to 6 and Comparative Examples 1 to 2

Spaghetti ("Ma-Ma Spaghetti" from Nisshin Foods Inc.; noodle thickness: 1.6 mm) was boiled such that the yield-after-boiling was 230%, and was cooled with cold water. Next, predetermined molds were each filled with 200 g of the boiled spaghetti and the spaghetti was frozen, to obtain annular ring-shaped frozen noodle blocks (main food portions) each having an opening, as a through hole, in the central portion, as illustrated in FIGS. 1 and 2. The molds used for producing the frozen noodle blocks respectively had shapes corresponding to the respective shapes of the frozen noodle blocks, and either had: (1) a shape in which a 28-mm-high circular-cylindrical projection was formed in the central portion on the bottom of a circular cylinder having an inner diameter of 150 mm and a depth of 30 mm; or (2) a shape in which the circular cylinder had the same shape but did not have a projection formed on the inside. By using, as projection-including molds, a plurality of types of molds having projections with different diameters, a plurality of types of frozen noodle blocks having openings with different opening lengths were obtained.

Further, a predetermined mold was filled with 95 g of meat sauce ("Ma-Ma Meat Sauce with Plenty of Tomato Pulp" from Nisshin Foods Inc.) and the meat sauce was frozen, to obtain a sauce portion having a circular planar-view shape and a dome-like shape, as illustrated in FIGS. 1 and 2. The mold used for producing the sauce portion had a shape corresponding to the shape of the sauce portion and had a depth of 40 mm, and the section corresponding to the upper surface of the sauce portion had an inner diameter of 95 mm. Thus, a sauce portion obtained by using this mold had a thickness (height) of 40 mm and the diameter of the upper surface was 95 mm Then, respective frozen noodle products, as frozen foods, were obtained by arranging the sauce portion in the central section on the upper surface (sauce-portion arranging surface) of the respective frozen noodle blocks in a manner such that, in cases where the frozen noodle block had an opening, the sauce portion covered the opening.

The frozen noodle product of Example 1 was configured like the frozen noodle product 1B (cf. FIG. 3); the lower end of the sauce portion was located at substantially the same position as the lower surface of the frozen noodle block and sections other than the upper end portion of the sauce portion were inserted in the opening of the frozen noodle block, whereas the upper end portion of the sauce portion projected from the sauce-portion arranging surface side of the frozen noodle block.

The frozen noodle products of Examples 2 to 6 were configured like the frozen noodle product 1A (cf. FIG. 2); the lower end of the sauce portion was located between the sauce-portion arranging surface (upper surface) and the lower surface of the frozen noodle block and was separated from the lower surface.

The frozen noodle product of Comparative Example 1 did not have an opening formed in the frozen noodle block, and the sauce portion was simply placed in the central section on the upper surface of the frozen noodle block, and was configured substantially like the frozen noodle product 100B illustrated in FIG. 7(b).

The frozen noodle product of Comparative Example 2 was configured like the frozen noodle product 100A (cf. FIG. 7(a)); the entire sauce portion was inserted in the opening of the frozen noodle block.

Evaluation Test 1:

The frozen noodle products of the Examples and Comparative Examples were thawed by being heated with a microwave oven at 600 W for 5 minutes 30 seconds, and were eaten by ten panelists who evaluated the quality of each frozen noodle product according to the following evaluation criteria. The results (average score of ten panelists) are shown in Table 1 below.

{Criteria for Evaluating Quality}

5: Very good; the sense of unity between the noodles and the sauce is very good, and the noodles are smooth and resilient.

4: Good; the sense of unity between the noodles and the sauce is rather good, and the noodles are smooth and resilient.

3: The sense of unity between the noodles and the sauce is rather poor, and the noodles slightly lack smoothness and resilience.

2: The sense of unity between the noodles and the sauce is poor, and the noodles are slightly soft and have poor resilience.

1: There is no sense of unity between the noodles and the sauce, and the noodles are soft and lack resilience.

TABLE 1

|  | Example | | | | | | Comparative Example | |
| --- | --- | --- | --- | --- | --- | --- | --- | --- |
|  | 1 | 2 | 3 | 4 | 5 | 6 | 1 | 2 |
| Volume of sauce portion (cm³) | 50.24 | 50.24 | 50.24 | 50.24 | 50.24 | 50.24 | 50.24 | 50.24 |
| Volumetric capacity of opening (cm³) | 49.98 | 37.68 | 25.12 | 12.56 | 6.28 | 3.77 | 0.00 | 50.24 |
| Percentage of opening occupied by sauce portion | 97.5 | 75.0 | 50.0 | 25.0 | 12.5 | 7.5 | 0.0 | 100.0 |

TABLE 1-continued

|  | Example | | | | | | Comparative Example | |
|---|---|---|---|---|---|---|---|---|
|  | 1 | 2 | 3 | 4 | 5 | 6 | 1 | 2 |
| (%) Quality of frozen noodle product when eaten | 3.9 | 4.1 | 4.9 | 4.8 | 4.2 | 3.7 | 2.4 | 2.1 |

Production Test Examples 1 to 7

Spaghetti ("Ma-Ma Spaghetti" from Nisshin Foods Inc.; noodle thickness: 1.6 mm) was boiled such that the yield-after-boiling was 230%, and was cooled with cold water. Next, 200 g of the cooked spaghetti was arranged on the inner bottom surface of a container, whose inner bottom surface was provided with a projection, in a manner so as to surround the projection, to thereby obtain a food-housing member that has, on the upper surface of the annular ring-shaped cooked noodle product, an exposed portion of the projection, like the food-housing member 50 illustrated in FIG. 10 (aforementioned step 1). Separately, a meat sauce was blended with gelatin ("GBL-200" from Nitta Gelatin Inc.), and immediately thereafter, a separately-prepared shaping container was filled with the meat sauce. The shaping container was kept still in a refrigerator at an inner-chamber temperature of 4° C. for 3 hours to cause the meat sauce to gel, thereby obtaining a sauce shaped product. The thus-obtained sauce shaped product was arranged onto the projection's exposed portion, and its periphery, on the upper surface of the food-housing member (aforementioned step 2 in the aforementioned first method). Then, the entire food-housing member, with the sauce shaped product placed thereon, was frozen (aforementioned step 3). Other than the aforementioned points, frozen noodle products, as frozen foods, were obtained in the same manner as the aforementioned Examples 1 to 6 and Comparative Examples 1 to 2. The shaping container used for preparing the sauce shaped product had a shape corresponding to the shape of the sauce portion and had a depth of 40 mm, and the section corresponding to the upper surface of the sauce portion had an inner diameter of 95 mm. Thus, the sauce shaped product, and by extension the sauce portion, obtained by using this shaping container had a thickness (height) of 40 mm and the diameter of the upper surface was 95 mm.

The frozen noodle products obtained according to Production Test Examples 2 to 7 were configured like the frozen noodle product 1A (cf. FIG. 2); the lower end of the sauce portion was located between the sauce-portion arranging surface (upper surface) and the lower surface of the frozen noodle block and was separated from the lower surface.

On the other hand, the frozen noodle product obtained according to Production Test Example 1 had a configuration wherein the lower end side of the sauce portion had a hollow circular-cylindrical shape that occupied substantially the entire space within the opening (through hole) in the frozen noodle block, and, although the lower end side of the sauce portion was inserted in the opening, the "lower end of the sauce portion" was difficult to distinguish. The configuration of the sauce portion in this Production Test Example 1 was due to the low shape-retaining force of the sauce shaped product before being frozen. Immediately after the sauce shaped product was arranged so as to cover the exposed portion of the projection, the sauce shaped product drooped down along the entire inner surface extending along the vertical direction of the opening and was formed by being frozen in this state.

Evaluation Test 2:

The frozen noodle products obtained according to the respective Production Test Examples were thawed by being heated with a microwave oven at 600 W for 5 minutes 30 seconds, and were eaten by ten panelists who evaluated the quality of each frozen noodle product according to the aforementioned evaluation criteria. The results (average score of ten panelists) are shown in Table 2 below.

Also, while conducting the Production Test Examples, the fillability of the gelatin-blended sauce into the shaping container at the time of preparing the sauce shaped product (easy fillability of sauce), and the shape retainability of the sauce shaped product immediately after being arranged onto the food-housing member (shape retainability of sauce) were evaluated according to the following evaluation criteria. The latter evaluation regarding the sauce's shape retainability was conducted based on the results of observing the sauce shaped product, which was prepared by refrigerating the sauce in a refrigerator as described above, immediately after it was taken out from the refrigerator and promptly arranged onto the food-housing member. The results are shown in Table 2 below.

{Easy Fillability of Sauce}
3: Almost no bubbles trapped in sauce, and sauce can be filled into container naturally.
2: Sauce can be filled into container, although somewhat many bubbles are trapped in sauce.
1: Many bubbles are trapped in sauce, and it is difficult to fill sauce into container.

{Shape Retainability of Sauce}
3: High shape-retaining force, and easy to handle.
2: Rather high shape-retaining force, and easy to handle.
1: Low shape-retaining force, and loses its shape.

TABLE 2

|  | Production Test Example | | | | | | |
|---|---|---|---|---|---|---|---|
|  | 1 | 2 | 3 | 4 | 5 | 6 | 7 |
| Content of gelatin in sauce (mass %) | 0.5 | 1 | 3 | 5 | 7 | 10 | 15 |
| Easy Fillability of Sauce | 3 | 3 | 3 | 3 | 2 | 2 | 1 |
| Shape Retainability of Sauce | 1 | 2 | 3 | 3 | 3 | 3 | 3 |
| Quality of frozen noodle product when eaten | 2.1 | 3.2 | 4.8 | 4.9 | 4.8 | 4.3 | 2.5 |

As shown in Table 2, Production Test Examples 1 and 7 had poorer results in terms of quality when those frozen noodle products were eaten, compared to the other Production Test Examples. The reason why Production Test Example 7 was evaluated poorly is surmise to be the excessive amount of gelatin contained in the sauce. The reason why Production Test Example 1 was evaluated poorly is surmise to be the too-small amount of gelatin contained in the sauce, which resulted in the unsuitable shape of the sauce portion (the hollow circular-cylindrical shape occupying substantially the entire space within the opening in the frozen noodle block) in the frozen noodle product before being thawed with a microwave oven. Considering the results of Production Test Example 1, it can be said that it is preferable for the frozen noodle product (frozen food) to not only have a configuration in which "the lower end side of the sauce portion is inserted in the opening of the frozen noodle block (main food portion), and the upper end side thereof projects from the sauce-portion arranging surface (upper surface) side of the frozen noodle block", but also have a configuration that is not possessed by the sauce portion of Production Test Example 1, i.e., a configuration in which "the sauce portion has a section whose length in the planar direction gradually decreases toward the lower end side" (cf. FIGS. 2 to 4) or a configuration in which "the lower end of the sauce portion is located between the sauce-portion arranging surface (upper surface) and the lower surface of the frozen noodle block (i.e., separated from the lower surface)" (cf. FIGS. 2, 4, and 5).

INDUSTRIAL APPLICABILITY

According to the present invention, it is possible to provide a frozen food that includes a cooked food and a sauce to be eaten therewith, and that offers excellent texture and an excellent sense of unity between the food and the sauce when eaten by being subjected to unassisted thawing or by being thawed/cooked by, for example, microwave thawing.

The invention claimed is:
1. A frozen food comprising:
a main food portion obtained by freezing and hardening a cooked food; and
a sauce portion obtained by freezing and hardening a sauce to be eaten together with the cooked food, wherein:
the main food portion has a sauce-portion arranging surface on which the sauce portion is arranged;
an opening is formed in the sauce-portion arranging surface;
the sauce portion is arranged on the main food portion such that a part of the sauce portion is inserted in the opening and the remaining part thereof projects from the sauce-portion arranging surface side;
the opening traverses the main food portion in a thickness direction;
a surface on the opposite side from the sauce-portion arranging surface of the main food portion is also opened; and
a lower end of the sauce portion is located between the sauce-portion arranging surface and the surface on the opposite side from the sauce-portion arranging surface;
wherein a percentage of the opening occupied by the sauce portion is from 12.5 to 75.0%;
wherein the main food portion is a frozen noodle block obtained by freezing and hardening a heated-and-cooked noodle product;
wherein the sauce portion includes gelatin as a gelling agent; and
wherein a content of gelatin in the sauce portion is from 1 to 10 mass % with respect to a total mass of said sauce portion.
2. The frozen food according to claim 1, wherein a lower end side of the sauce portion is inserted in the opening, and an upper end side thereof projects from the sauce-portion arranging surface side.

3. The frozen food according to claim 1, wherein the sauce portion has a section whose length in a planar direction gradually decreases toward the lower end side.
4. A process for producing the frozen food according to claim 1, the process for producing the frozen food comprising:
a step of arranging the cooked food on an inner bottom surface of a container whose inner bottom surface is provided with a projection having the same planar-view shape as the opening, the cooked food being arranged on the inner bottom surface so as to surround the projection to thereby obtain a food-housing member that has, on an upper surface thereof, an exposed portion of the projection;
a sauce-placing step of placing the sauce that has been blended with a gelling agent onto the projection's exposed portion, and its periphery, on the upper surface of the food-housing member; and
a step of freezing the food-housing member that has undergone the sauce-placing step.
5. The frozen food production process according to claim 4, wherein:
the content of the gelling agent in the sauce is from 1 to 10 mass %; and
in the sauce-placing step, a shaped product of the sauce that has been shaped into a predetermined shape in advance is placed on the upper surface of the food-housing member.
6. The frozen food according to claim 2, wherein the sauce portion has a section whose length in a planar direction gradually decreases toward the lower end side.
7. A process for producing the frozen food according to claim 2, the process for producing the frozen food comprising:
a step of arranging the cooked food on an inner bottom surface of a container whose inner bottom surface is provided with a projection having the same planar-view shape as the opening, the cooked food being arranged on the inner bottom surface so as to surround the projection to thereby obtain a food-housing member that has, on an upper surface thereof, an exposed portion of the projection;
a sauce-placing step of placing the sauce that has been blended with a gelling agent onto the projection's exposed portion, and its periphery, on the upper surface of the food-housing member; and
a step of freezing the food-housing member that has undergone the sauce-placing step.
8. A process for producing the frozen food according to claim 3, the process for producing the frozen food comprising:
a step of arranging the cooked food on an inner bottom surface of a container whose inner bottom surface is provided with a projection having the same planar-view shape as the opening, the cooked food being arranged on the inner bottom surface so as to surround the projection to thereby obtain a food-housing member that has, on an upper surface thereof, an exposed portion of the projection;
a sauce-placing step of placing the sauce that has been blended with a gelling agent onto the projection's exposed portion, and its periphery, on the upper surface of the food-housing member; and
a step of freezing the food-housing member that has undergone the sauce-placing step.

* * * * *